W. J. BELCHER.
DRIVE CHAIN.
APPLICATION FILED MAY 13, 1909.
953,114.
Patented Mar. 29, 1910.
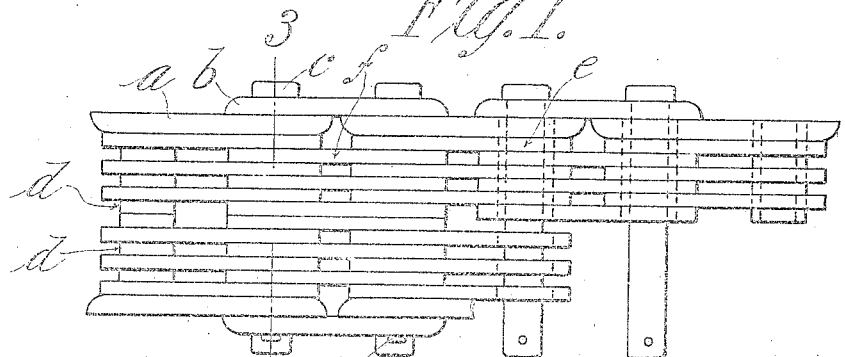
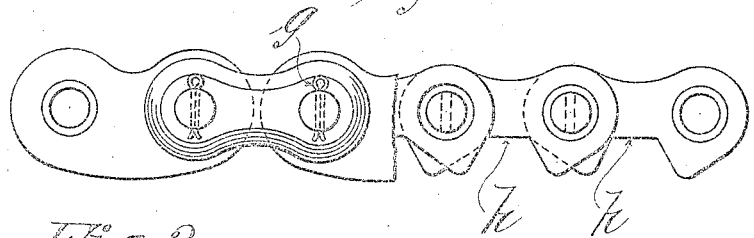
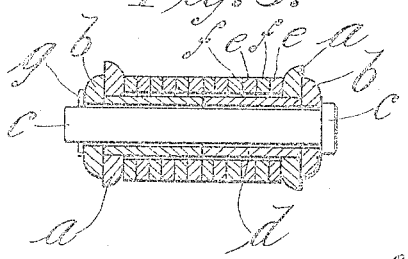
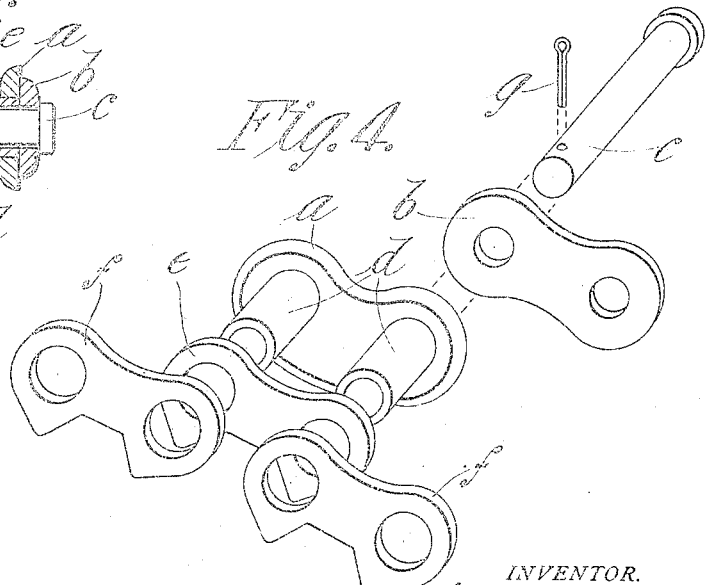
WITNESSES:
H. L. Sprague
Harry W. Bowen
INVENTOR.
Warren J. Belcher
BY
Chapin & Lee
ATTORNEYS.

UNITED STATES PATENT OFFICE.

WARREN J. BELCHER, OF HARTFORD, CONNECTICUT, ASSIGNOR TO THE WHITNEY MANUFACTURING COMPANY, OF HARTFORD, CONNECTICUT, A CORPORATION.

DRIVE-CHAIN.

953,114.  Specification of Letters Patent.  Patented Mar. 29, 1910.

Application filed May 13, 1909. Serial No. 495,794.

*To all whom it may concern:*

Be it known that I, WARREN J. BELCHER, a citizen of the United States of America, residing at Hartford, in the county of Hartford and State of Connecticut, have invented new and useful Improvements in Drive-Chains, of which the following is a specification.

This invention relates to drive-chains, and the object of the invention is fully set forth in the following specification and illustrated in the accompanying drawings, in which,—

Figure 1 is a plan view of a part of a chain in which the invention is embodied. Fig. 2 is a side elevation of the chain shown in Fig. 1. Fig. 3 is a cross section of the chain taken on the line 3—3, Fig. 1, and Fig. 4 is an isometric view of certain associated parts of the chain shown in separated relation.

Referring to the drawings, $a$ indicates one of the side-plates of the chain, and $b$ one of the connecting plates, the latter serving to pivotally connect two side plates, as shown in Figs. 1 and 2 particularly, by means of the pins $c$ which extend through holes in the ends of both the side plates and the connecting plates, the ends of which overlap the ends of the side plates. In each of the holes in the side plates $a$ through which the pins $c$ pass, is tightly fitted a bushing $d$, the length of which is one-half the width of the chain, and on these bushings are located the link members $e$ and $f$ in the order shown in Fig. 1, $e$ indicating those which are fitted over the two bushings $d$ in the same side plate, and $f$ those which are fitted over one bushing in each of two side plates placed end to end. The link members $e$ therefore may be considered as auxiliary to the side plates $a$, and the members $f$ as auxiliary to the connecting plates $b$. The thickness of the link members $e$ and $f$ is so proportioned that when the members are placed in position on the bushing, the inner end of the latter will be flush with the side of the last member placed thereon. The pins $c$ fit the interior of the bushings closely, each pin, when it is passed through the chain, being secured in position preferably by means of a cotter-pin $g$, the opposite end of the pin having a head thereon, as shown. When the chain is thus assembled, the resistance to breakage under an endwise stress or tension will be equal to the resistance of the smallest cross sectional area of the assembled connecting side plates and link members, or to the resistance of the pins $c$ to the transverse shearing stresses of the connecting plates or side plates, or member. The pins are, to a certain extent only, reinforced by the bushings, but such reinforcements would exist only at the points where the bushings are tightly fitted into the side plates; but under ordinary conditions of use no stress whatever is put upon the bushings, and only the members $f$, which are auxiliary to the side plates, have any frictional action on these bushings, since the members $e$ (which are auxiliary to the side plates and extend from one bushing to the other on the same plate $a$) can have no movement relative to the bushing: and when the plates $a$ and the members $e$, auxiliary thereto, are subjected to movement in passing over a sprocket or other toothed wheel, the frictional contact is entirely between the bushing and the pin.

In the drawings, the link members $e$ and $f$ are shown provided with the recess $h$ in the under side thereof which is adapted to fit over the ends of the teeth of a sprocket-wheel and ride thereon: but this particular form of member has nothing to do with the invention, and any other type of member may be substituted therefor, if desired.

If, by reason of long use or accident, it becomes necessary to replace any part of the chain, such replacement may be effected without any other tool than such as may be necessary to remove the cotter-pins $g$, for after such removal the pivot-pins $c$ may be withdrawn, and by separating the two side plates $a$ at the point where the replacement is required, the members $e$ and $f$ may be withdrawn from their position on the bushings $d$ and replaced by new members; or if the injury is to one of the side plates $a$, or to one of the connecting plates $b$, like replacement may be made and the chain put together again in a few moments.

Unlike chains of this character, as heretofore made within the knowledge of applicant, the chain embodying this invention is separable at any point thereof, and yet the bushings are all tightly fitted in the side plates and hence will not rattle when the chain is in use. Of course, it is quite possible to construct a chain embodying the essential features of the invention without the connecting plates $b$, and though such a chain would be of less tensile strength, it would embody all of the elements necessary to its proper operation as a drive-chain.

What I claim, is:—

1. A chain comprising oppositely disposed side plates, and bushings in each plate extending toward the opposite plate, each pair of bushings having a common axis, pins in the bushings, connecting plates through which the pins extend to pivotally unite two pairs of side plates placed end to end, and link members mounted on the bushings.

2. A chain consisting of side plates and connecting plates, pins pivotally uniting said plates in overlapping relation, transversely divided bushings on the pins, the two parts of said bushings being secured respectively in opposite side plates, and link members on the bushings, said plates being separable from each other and said link members being separable from said bushings, at any point in the chain.

3. A chain consisting of side plates and connecting plates, pins pivotally uniting said plates, bushings in the side plates extending from one side toward the other, said pins passing through said bushings, and link members loosely fitted on the bushings, certain of said members extending in one direction to one bushing and certain others extending in an opposite direction to another bushing, said link members and said plates being separable from the pins at any point in the chain.

4. The combination of oppositely disposed side plates and connecting plates pivotally united together to form a chain, a bushing in each side plate extending toward its fellow in the opposite side plate, said bushings having a common axis, and pins in the bushings, link members loosely fitted on the bushings, certain of said members extending to another bushing in one direction and certain of said link members extending in an opposite direction to another bushing.

5. A chain construction comprising side and connecting plate members, bushings secured to said side members and terminating at or near the median line of the chain, links mounted on the bushings, pins extending through the bushings and said members, whereby any link may be removed from the chain, as described.

WARREN J. BELCHER.

Witnesses:
 Wm. H. Chapin,
 H. W. Bowen.